Patented Oct. 18, 1949

2,485,162

UNITED STATES PATENT OFFICE 2,485,162

7-CHLORO-4-(1-ETHYL-4-PIPERIDYL-AMINO)-QUINOLINE

Billy Gene Parham, Urbana, Ill., assignor to the United States of America as represented by the Secretary of War No Drawing. Application April 8, 1946, Serial No. 660,410

1 Claim. (Cl. 260—288)

The present invention relates to a novel class of compounds characterized by superior antimalarial properties, and to methods of preparing the same.

Within the past several years, interest in the synthesis of antimalarial drugs has been greatly stimulated by the recently reported therapeutic properties of certain members of the acridine, the 4-aminoquinoline and the 8-aminoquinoline classes; notably 6-chloro-2-methoxy-9-(5-diethylaminopentyl-2-amino)acridine (I) or "quinacrine"; 7-chloro-4-(5-diethylaminopentyl-2-amino)quinoline (II) or "SN-7618"; and 8-(5'-isopropylaminopentylamino)-6-methoxy-quinoline (III) or "SN-13276."

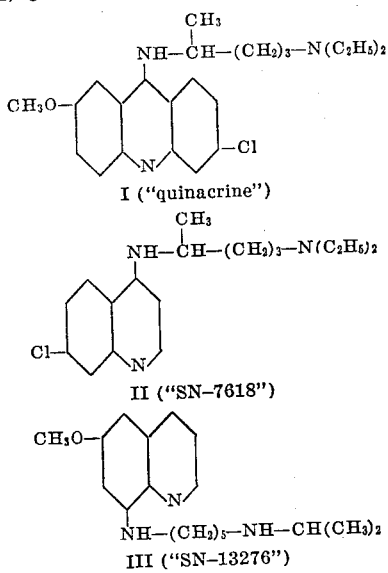

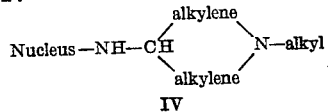

The outstanding therapeutic properties of quinacrine, SN-7618 and SN-13276 relative to quinine in the treatment of certain types of malaria has led to an intensive reexamination of other synthetic compounds in the hope that even more effective drugs might be developed.

Broadly stated, the object of the present invention is to provide a new and improved class of synthetic antimalarial drugs having a novel type of side chain and characterized by the general structure IV Nucleus—NH—CH(alkylene)(alkylene)N—alkyl

IV the nucleus in IV being either a quinoline, sub-
stituted quinoline, acridine or substituted acridine nucleus.

A more specific object is the provision of a novel class of 4-aminoquinoline compounds having suppressive antimalarial properties approximately equivalent to those of SN-7618 and other previously known drugs, but characterized by a significantly lower toxicity to the host or patient.

Another object is to develop a suppressive antimalarial whose toxicity to the host is not only of a lower order of magnitude than that of SN-7618, but of a qualitatively different character.

Still another object is to provide suitable methods for the preparation of such drugs, starting with readily available raw materials, and converting these to the desired drug by processes that may be carried out in readily available equipment, with high yields.

Other objects and advantages of the invention will be apparent as the description progresses.

It has been discovered, in accordance with the present invention, that the foregoing objects may be attained by the synthesis of certain compounds having the characteristic side chain shown in IV.

In the 4-aminoquinoline series, the compounds in accordance with the present invention may be illustrated by those having the typical structure V

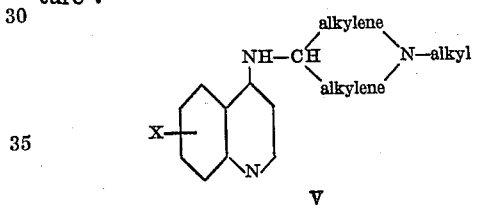

V wherein X represents a nuclear substituent such as halogen, the alkylene groups in V preferably being polymethylene groups. The preferred embodiment of the present invention, insofar as the 4-aminoquinoline series is concerned, consists of 7-chloro-4-(1-ethyl-4-piperidylamino)quinoline (VI), which will hereinafter be designated "SN-13425."

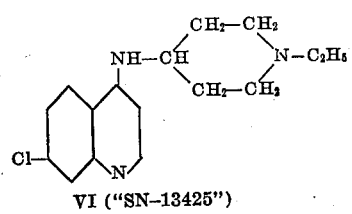

VI ("SN-13425")

For purposes of convenience and simplicity, the preparation of the class of compounds IV in accordance with the present invention will hereinafter be illustrated by reference to the synthesis of a preferred embodiment, namely SN-13425. This compound may readily be prepared in high yields by the condensation of 4,7-dichloroquinoline (VII) with 1-ethyl-4-aminopiperidine (VIII).

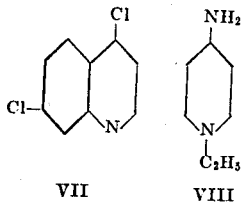

VII     VIII

The latter compound (VIII) is new, and represents a type of compound of which very few examples have heretofore been known. It is therefore desirable to explain in some detail several alternative methods of preparing the necessary intermediate (VIII) for the synthesis of the drugs of type V.

One method used for the preparation of the intermediate (VIII) takes advantage of the availability of 1-alkyl-4-piperidones (X) which may be prepared by the method employed by Bolyard and McElvain. [See J. Am. Chem. Soc. 51, 922 (1929).]

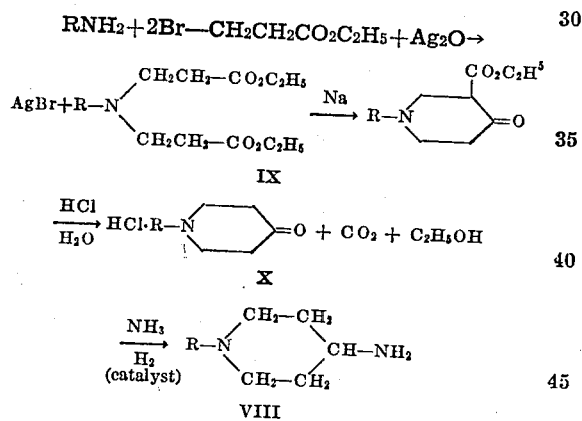

VIII

A more convenient method for the preparation of the intermediate IX in the above equations was found to be the addition of alkylamines to ethyl acrylate according to the scheme:

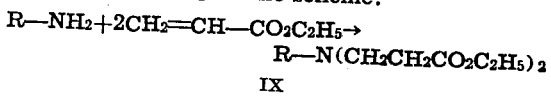

IX

When this method was used with ethylamine, for example, a 91–94% yield of bis-($\beta$-carbethoxyethyl)ethylamine (IX, R=ethyl) was obtained. The ring closure of this compound, and the decarboxylation of the cyclized product, carried out essentially according to the methods of Bolyard and McElvain [J. Am. Chem. Soc. 51, 922 (1929)] gave 82–87% yields of 1-ethyl-4-piperidone hydrochloride, based on the bis-($\beta$-carbethoxyethyl)-ethylamine (IX) used. Since the low molecular weight piperidones of the general type X are known to be unstable, no attempt was made to isolate 1-ethyl-4-piperidone. Instead, the hydrochloride X salt was converted to the free base, the latter taken up in a solvent and converted in high yields by suitable means such as reductive amination to 1-ethyl-4-aminopiperidine (VIII). This essential intermediate (VIII) was then condensed with an equimolar proportion of 4,7-dichloroquinoline, to form the desired 7-chloro-4-(1-ethyl-4-piperidylamino)quinoline (VI) in excellent yields.

In order more clearly to disclose the nature of the present invention, an example of the preferred method of preparing SN-13425 [7-chloro-4-(1-ethyl-4-piperidylamino)quinoline] will hereinafter be described in considerable detail. It should be understood however that this is done solely for purposes of illustration, and not with a view to delineating the scope of the invention or limiting the ambit of the appended claim.

*Example*

The procedure described in detail below may be represented as follows:

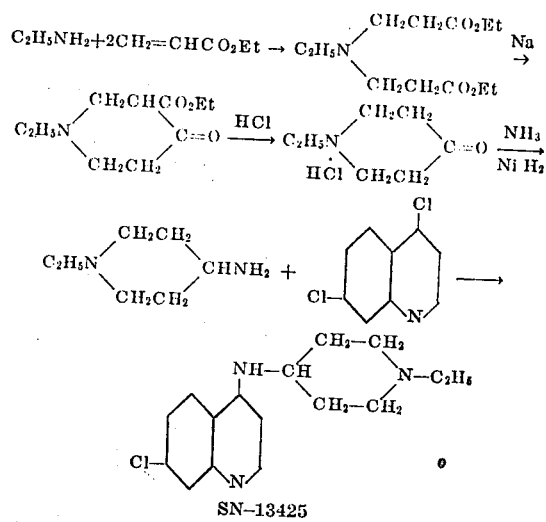

SN–13425

In the following description, temperatures are given in degrees centigrade.

*Bis-($\beta$-carbethoxyethyl)ethylamine.*—In a 2-l. round-bottomed flask, fitted with a rubber stopper carrying a soda-lime drying tube and a glass tube reaching almost to the bottom, was placed 325 g. (420 ml.) of commercial absolute ethanol. The whole was then tarred, placed in an ice bath and the inlet tube connected to a source of dry ethylamine.

The ethylamine generator consisted of a 1-l. flask fitted with a dropping funnel and outlet tube which in turn was connected to a 25-ml. drying tower, containing soda-lime, followed by a 1-l. safety trap. In the flask was placed 240 g. of sodium hydroxide pellets. Forty grams of 70% aqueous ethylamine was added and after the reaction had subsided an additional 160 g. of aqueous amine was introduced. The contents of the flask were shaken and warmed in such a manner as to effect a continuous stream of ethylamine. When the addition was completed, the flask and contents were removed and weighed. The increase in weight was 135 g. (3.0 moles).

The flask was immersed in an ice-salt bath and 640 g. (6.4 moles) of freshly distilled ethyl acrylate in 400 g. of absolute ethanol was added at such a rate that the temperature of the reaction mixture did not rise above 20°. After such addition the flask was stoppered and allowed to stand for eight days.

The alcohol was removed by distillation under water-pump pressure and the residue transferred to an 8-in. beryl saddle still. After a small forerun (6 g.), 694 g. (94.4° of theoretical) of material was collected boiling at 110–111° (1.1 mm.), $n_D^{20}$ 1.4404–1.4395. A small sample was redistilled and submitted for analysis.

Anal. Calcd. for $C_{12}H_{23}O_4N$: N, 5.71. Found: N, 5.53.

*1-ethyl-3-carbethoxy-4-piperidone hydrochloride.*—To a 2-1.

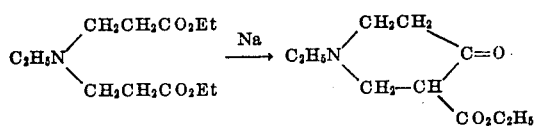

three-necked, ground-joint flask, fitted with a dropping funnel, reflux condenser protected from moisture by a calcium chloride tube, and a Herschberg stirrer was added 35 g. of sodium (1.52 gram atoms) and 400 cc. of redistilled dry xylene. The xylene was heated to boiling, the source of heat removed and the stirrer started. When the sodium was finely powdered 2 ml. of absolute ethanol and 10 ml. of bis-(β-carbethoxyethyl)ethylamine was added. A yellow flocculent precipitate appeared. The remainder of the amine (a total of 387 g., 1.58 moles) was then added at such a rate as to maintain gentle reflux (45–50 minutes). When the addition was complete, the mixture was stirred and heated under reflux for an additional hour. At this point, all of the solid was usually in solution. The oil bath was removed and the reaction mixture allowed to cool for about five minutes, then poured into a 2-l. separatory funnel containing 200 g. of ice and 400 cc. of ice water. The contents of the separatory funnel were shaken vigorously and the layers allowed to separate. An additional amount of water (250-300 cc.) was used to wash the xylene layer and to dissolve any salt which may have separated during the first washing. The aqueous layer was filtered and the salt washed with ether. The filtrate was then extracted with two 150-ml. portions of ether. The ether and xylene extracts contained no appreciable amount of either starting material or product, and were discarded.

The aqueous solution combined with the salt from the filtration was cooled below 10° and while keeping the temperature at this point, the solution was made acid to Congo red with concentrated hydrochloric acid (260-275 cc.). The acidic solution was neutralized with solid technical potassium carbonate, cooled below 0° and placed in a 4-l. separatory funnel. Approximately 800 g. of potassium carbonate was added in two portions, with shaking. An orange layer of amine separated and was drawn off. The aqueous layer was cooled to 0°, an additional 400 g. of potassium carbonate was added and the mixture extracted with a total of 1 l. of ether. The organic layer and ether extracts were combined and shaken with two 50-ml. portions of a saturated solution of sodium chloride.

*1-ethyl-4-piperidone hydrochloride.*—The ether solution of 1-ethyl-3-carbethoxy-4-piperidone was extracted with a total of 430 ml. of hydrochloric acid (270 ml. of concentrated hydrochloric acid in 160 ml. of water). One hundred and fourteen milliliters of concentrated hydrochloric acid was then added to this solution (this theoretically gives a solution of 1-ethyl-3-carbethoxy-4-piperidone hydrochloride in 20% hydrochloric acid), the dissolved ether was removed by heating, and the whole heated under reflux until a drop of the solution failed to give a red color when added to a 1% solution of ferric chloride (approximately four hours). The aqueous solutions of 1-ethyl-4-piperidone hydrochloride (light orange in color) was evaporated to dryness on a steam bath at water-pump pressure. The weight of light orange solid is 211-223 g. (82-87% based on the bis (β-carbethoxyethyl)ethylamine used).

*1-ethyl-4-aminopiperidine.*—Sixty-five grams (0.4 mole) of the 1-ethyl-4-piperidone hydrochloride prepared as directed above was dissolved in 50 ml. of water in a 200-ml. Erlenmeyer flask and the resulting solution cooled to −2° and placed in a 500-ml. separatory funnel. The flask was washed with 20 ml. of water, which was also added to the separatory funnel. Seventy-five milliliters of cold ether was added and then 100 g. of technical potassium carbonate in portions with shaking. The ether layer was separated and the remaining pasty material extracted with three 75-ml. portions of ether. The ether extracts were combined and filtered rapidly through a double thickness of fluted filter paper. The filtered solution was dried for one to two hours over 15 g. of anhydrous magnesium sulfate and then filtered two times through a single thickness of filtered paper. Dry ether was used liberally in washing filter papers, etc. The ether was removed under reduced pressure keeping the temperature of the residue below 25°. Approximately 50 ml. of a light orange oil remained. The oil was placed in a 270-ml. high-pressure bomb together with 40 ml. of absolute ethanol, 1 teaspoon of Raney nickel catalyst and 55 ml. of liquid ammonia. An initial pressure of 2900 lbs. of hydrogen was introduced; the bomb was heated to 150°, and shaken at this temperature for forty-five minutes. The bomb was cooled to room temperature and opened. The Raney nickel was filtered and the bomb washed well with dry ether. The organic solvents were removed under reduced pressure (water pump) and the residue distilled through a 6-in. column packed with glass helices. A small forerun was collected and then 1-ethyl-4-aminopiperidine collected at 73° (16 mm.); 29.3 g. (57% of theory); $n_D^{19.5}$ 1.4725. A liquid residue (mainly 1-ethyl-4-hydroxypiperidine) weighing 11.4 g. remained in the distilling flask.

A portion of the 1-ethyl-4-aminopiperidine was redistilled and submitted for analysis.

Anal. calcd. for $C_7H_{16}N_2$: C, 65.57; H, 12.58; N, 21.85. Found: C, 65.14; H, 12.65; N, 22.15.

The amine hydrates rapidly when exposed to the atmosphere. The sulfonamide of the amine was prepared by the usual Hinsberg method and was amphoteric as would be expected. It was not treated further. The picrate of this amine was formed in the usual manner. It was recrystallized from glacial acetic acid, M. P. 254-255° (dec.).

Anal. Calcd. for $C_{19}H_{22}N_8O_{14}$: C, 38.91; H, 3.78. Found: C, 39.07; H, 3.95.

*7-chloro-4-(1-ethyl-4-piperidylamine)quinoline.*—In a 500-ml. three-necked, ground joint flask equipped with a reflux condenser protected from moisture by a calcium chloride tube and a mechanical stirrer was added 38.2 g. (0.298 mole) of 1-ethyl-4-aminopiperidine, 57.4 g. (0.29 mole) of 4,7-dichloroquinoline and 30 g. of phenol. This mixture was heated with stirring at 150–160° for ten hours and at 160-168° for two and one-half hours. While hot, the viscous material was poured into 160 cc. of a cold solution of 40 cc. of concentrated hydrochloric acid and 210 cc. of water. The remaining 90 cc. of hydrochloric acid solution was used to dissolve the material which did not pour out of the reaction flask. About 100 cc. of water was used for washing purposes. The aqueous solution filtered, cooled to approximately 10° and extracted with three 150-cc. portions of ether. The light orange aqueous solution was placed in a 2-l. beaker immersed in an ice bath and while stirring made alkaline with cold 20% potassium hydroxide.

An orange-brown pasty material separated which upon stirring for a short time formed to a finely divided tan solid. The solid was filtered, washed well with water and dried for two hours in an oven at 80°.

The partially dried solid was added to 2500 ml. of hot thiophene-free benzene which was then heated under reflux until solution was effected. Approximately 400 ml. of the benzene was distilled to remove water and then 7 g. of Norite and 400 ml. of benzene were added and the mixture heated under reflux for five minutes. The solution was filtered through a fluted filter and the latter washed with approximately 300 ml. of hot benzene. The filtrate was allowed to cool to room temperature and then cooled in an ice bath. Fine white crystals separated, which were filtered and washed first with cold benzene and then with cold ether. The solid was dried in an oven at 80° for two hours. Sixty-seven grams (80% of theory) of white crystals, M. P. 195–197° (with decomp.) was obtained. A sample was recrystallized from benzene and submitted for analysis.

Anal. Calcd. for $C_{16}H_{20}N_3Cl$: C, 66.31; H, 6.96; N, 14.50. Found: C, 66.29; H 7.12; N, 14.26.

The foregoing procedure represents a method of preparing the preferred drug, starting with readily available raw materials (ethylamine, ethyl acrylate, etc.) and proceeding by steps, all of which give high yields. Alternative methods may however be used if desired. Thus, for example, the 1-alkyl-4-aminopiperidine intermediates may be prepared by suitable modifications of the procedures of Cerkovnikov and Prelog [Ber. 74B, 1648, 1658 (1941); Helv. Chim. Acta, 26, 1132 (1943)] who developed the following two methods for the synthesis of substituted 4-aminopiperidines:

1. 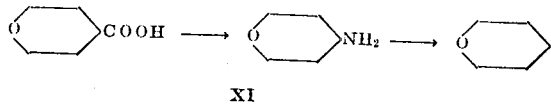

XI

2. 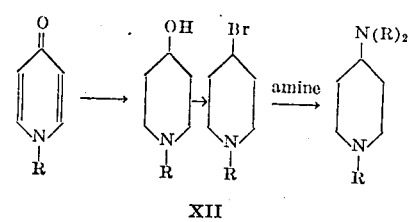

XII

The first method was applied by these authors mainly to the synthesis of 4-dimethylamino-piperidines; however, 1-phenyl-4-aminopiperidine was also prepared by them in 45% yield by the condensation of XI (R=H) with aniline. A variety of amines were prepared by the same authors using the second method; however, the yields were not high—mainly because of the tendency of XII to lose hydrogen bromide to yield tetrahydropyridine derivatives. 1-phenyl-4-amino-piperidine was made in 14% yield by the condensation of XII (R=C6H5) with alcoholic ammonia.

The modifications in these two general methods required to produce the intermediates used in the preparation of the herein described drugs will be readily apparent to those skilled in the art. However, because of the availability of 1-alkyl-4-piperidones, the preferred method for the synthesis of the corresponding 4-amino-piperidines appears to be the reductive amination of these ketones, as described in detail in the foregoing example.

Many other modifications of the preferred procedure will be readily apparent to the chemist. It will also be apparent that the basic principles may be used for the preparation of a wide variety of compounds of the type IV including, for example, the "pamaquine analogue" XIII, the "quinacrine analogue" XIV, and a host of similar compounds.

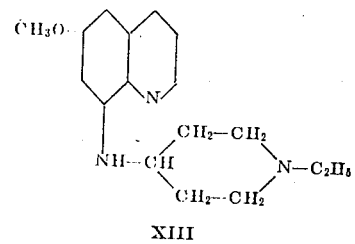

XIII

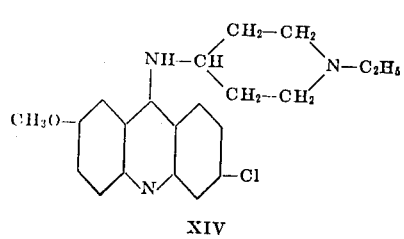

XIV

All these and similar variations, modifications or extensions of the basic principles of the present invention are to be understood to be included within the scope of the appended claim.

I claim:

7-chloro-4-(1-ethyl-4-piperidylamino)quinoline.

BILLY GENE PARHAM.

REFERENCES CITED

The following references are of record in the file of this patent:

UNITED STATES PATENTS

| Number | Name | Date |
|---|---|---|
| 1,903,196 | Schulemann et al. | Mar. 28, 1933 |
| 2,233,970 | Andersag et al. | Mar. 4, 1941 |

FOREIGN PATENTS

| Number | Country | Date |
|---|---|---|
| 134,218 | Switzerland | Sept. 16, 1929 |
| 136,293 | Switzerland | Jan. 16, 1930 |

OTHER REFERENCES

McElvain: Jour. Amer. Chem. Soc., vol. 48, pages 2179–2182 (1926).

Rubstov: Jour. Gen. Chem. (U. S. S. R.), vol. 9, pages 1517–1524 (1939).